United States Patent [19]

Isaka et al.

[11] Patent Number: 5,398,052
[45] Date of Patent: Mar. 14, 1995

[54] IMAGE FORMING APPARATUS USING OVERLAPPING LIGHT BEAMS

[75] Inventors: Kazuo Isaka, Tokyo; Masato Katayama, Yokohama; Akihiro Mouri, Kokubunji; Tetsuro Fukui, Kawasaki, all of Japan

[73] Assignee: Canon Kabushiki Kaisha, Tokyo, Japan

[21] Appl. No.: 787,899

[22] Filed: Nov. 5, 1991

[30] Foreign Application Priority Data

Nov. 7, 1990 [JP] Japan ................... 2-303397

[51] Int. Cl.⁶ .................................................. G01D 9/42
[52] U.S. Cl. ........................................ 347/233; 347/129
[58] Field of Search .................. 346/108, 107 R, 160, 346/76 L

[56] References Cited

U.S. PATENT DOCUMENTS

| | | | |
|---|---|---|---|
| 4,096,486 | 6/1978 | Pfeifer et al. | 346/107 R |
| 4,476,474 | 10/1984 | Kitamura | 346/160 |
| 4,805,973 | 2/1989 | Watanabe | 350/66 |
| 4,864,326 | 9/1989 | Kawamura et al. | 346/108 |
| 4,978,974 | 12/1990 | Etzel | 346/108 X |
| 5,014,075 | 5/1991 | Okino | 346/108 |
| 5,021,321 | 6/1991 | Fukui et al. | 430/201 |
| 5,089,908 | 2/1992 | Jodoin et al. | 346/108 X |
| 5,128,693 | 7/1992 | Tatemichi et al. | 346/108 |
| 5,151,714 | 9/1992 | Okino et al. | 346/108 |
| 5,170,180 | 12/1992 | Doi | 346/108 X |
| 5,270,727 | 12/1993 | Yamamoto et al. | 346/76 L |

FOREIGN PATENT DOCUMENTS 201306 12/1986 European Pat. Off. .

*Primary Examiner*—A. T. Grimley
*Assistant Examiner*—Nestor R. Ramirez
*Attorney, Agent, or Firm*—Fitzpatrick, Cella, Harper & Scinto

[57] ABSTRACT

An image recording apparatus for recording an image by application of light beam to a photosensitive member includes a photosensitive member; a light source for emitting first and second beams, one of the first and second beams bearing image information; and a scanner for scanning the photosensitive member with the first and second beams with a time interval so that they are overlapped on the photosensitive material.

5 Claims, 3 Drawing Sheets

IMAGE FORMING APPARATUS USING OVERLAPPING LIGHT BEAMS

FIELD OF THE INVENTION AND RELATED ART

The present invention relates to an image forming apparatus for recording a light image by scanning the recording material (photosensitive member) with a fine spot of light.

An optical recording apparatus wherein a light image is recorded by scanning the recording material with fine spot of light is known as in laser beam printer or light engraver or the like.

The recording apparatus has advantages that the resolution is higher than thermal recording machines such as heat-sensitive recording machines, and that the recording speed is high. Silver salt materials, photoresist materials, sublimation materials, electrophotographic materials or other photosensitive materials have such a nature that even if the exposure amount is the same, the sensitivity decreases when it is exposed for a short period of time.

Therefore, in the conventional machines, when a high speed recording is effected, particularly, at $10^{-8}$ — $10^{-7}$ sec/dot, the effective sensitivity decreases due to the high intensity short-time reciprocity law of the photosensitive materials, and therefore, a large power light source is required.

In the conventional machines, in order to reproduce the tone gradation, the output light quantity from the light source for each dot, has to be changed in multi-levels. However, particularly in the case of the semiconductor laser, it has been very difficult to finely control the output quantity of light.

SUMMARY OF THE INVENTION

Accordingly, it is a principal object of the present invention to provide a recording apparatus wherein the reproducibility of the tone gradation is improved.

According to an embodiment of the present invention, there is provided an image recording apparatus for recording an image by application of light beam to a photosensitive member, comprising: a photosensitive member; light source means for emitting first and second beams, one of the first and second beams bearing image information; and scanning means for scanning said photosensitive member with the first and second beams with a time interval so that they are overlapped on said photosensitive material.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiment 1

Figure 1:
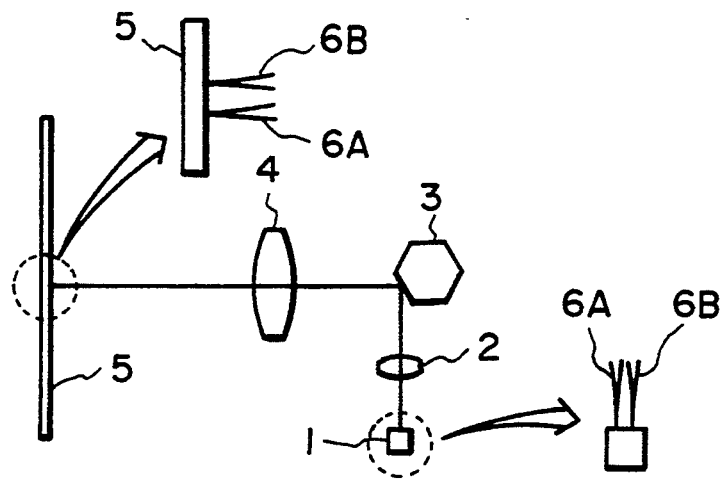
FIG. 1 shows a light recording apparatus according to a first embodiment of the present invention.

FIG. 1 shows a general arrangement of the light recording apparatus according to an embodiment of the present invention.

It comprises a semiconductor array 1 for generating a laser beam, a first optical system 2 including a collimator lens and a cylindrical lens, a polygonal mirror 3, an f$\theta$ lens (second optical system) 4, and a dry silver salt photosensitive material 5 in the form of a sheet suitable for a semiconductor laser. The sheet moves at a constant speed in a direction perpendicular to the surface of the drawing.

Two laser beams 6A and 6B are emitted from the semiconductor array 1 pass through the first optical system, reflected by the polygonal mirror 3 and are images through the second optical system on the photosensitive material 5 as oval spots spaced by approximately 1 mm in the main scan direction of the laser beam on the same scanning line. The oval spot has a dimension of 20 microns in the main scan direction and 40 microns in the subordinate scan direction. They scan the recording surface of the photosensitive material at 100 ns/dot. In this scanning method, the recording is effected with the recording energy up to 125 micro-J/cm$^2$ by 5 mW output laser.

Figure 2:
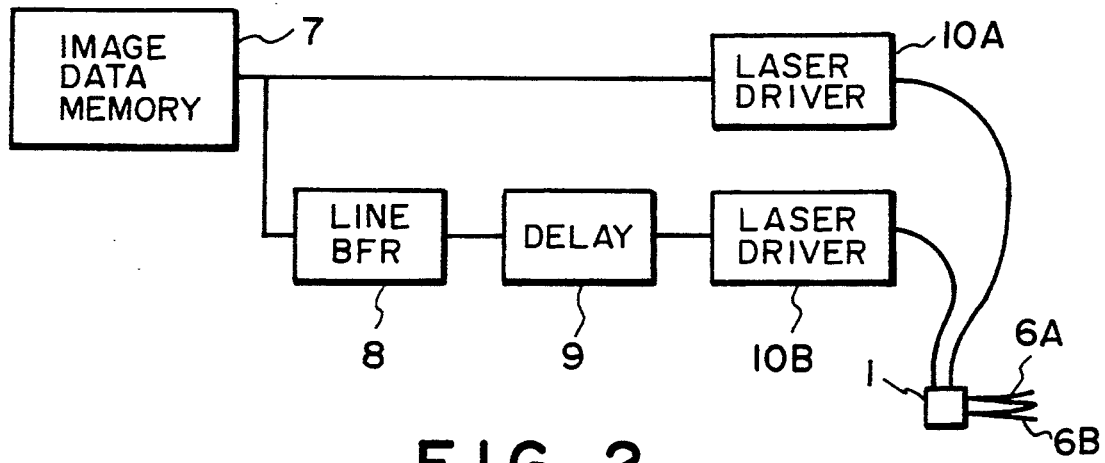
FIG. 2 is a block diagram of an electric circuit for light scan in the apparatus of the first embodiment.

FIG. 2 is a block diagram of a circuit for driving the semiconductor laser. The image data signal supplied from an image data memory 7 is supplied to a laser driver circuit 10a and a line buffer 8. The image data signal supplied to the line butter 8 is delayed by at predetermined time period T by a delay circuit 9, and then, is supplied to a laser driver circuit 10b. The laser driver circuit actuates the semiconductor laser 1 to generate the laser beam representing the image in accordance with the image data with the time difference T, so that a point on the photosensitive material 5 is exposed twice (same information) because of the delay T by the delay circuit.

The time difference T is x/v where v is the scanning speed of the laser beam 6 on the photosensitive material 5, and x is the distance between the laser beam spot 6A and the spot 6B on the photosensitive material. In this example, the delay T is approximately 5 micro-sec.

By the double exposure of the same information on the photosensitive material 5:

(1) The first or the second exposure is effective as a light bias against the high intensity short time reciprocity of the photosensitive material such that the sensitivity of 100 micro-J/cm$^2$ (single exposure by laser beam) is changed to 80 micro-J/cm$^2$ at which the recording is possible: and (2) The tone gradation performance is increased by making the laser outputs for the first and second exposures different.

Embodiment 2

Figure 3:
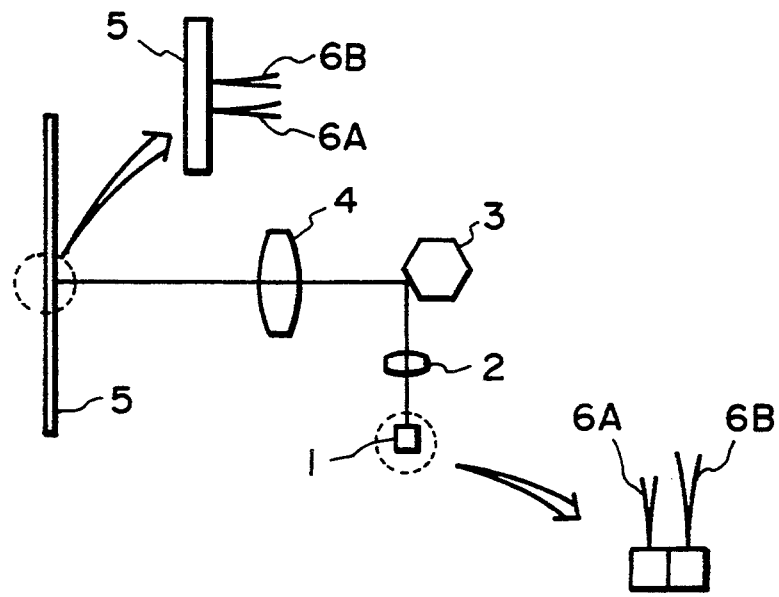
FIG. 3 shows a light recording apparatus according to another embodiment of the present invention.

FIG. 3 shows a general arrangement of the apparatus according to a second embodiment of the present invention. In this embodiment, two semiconductor lasers producing different wavelength beam are arranged in a horizontal plane, and the same driving is carried out as in the first embodiment. The wavelength of the first laser 6a corresponds to an absorption wavelength of the sensitization dye of the silver salt photosensitive material (837 m), and the wavelength of the second laser 6b corresponds to the silver inherent sensitivity wavelength of the silver salt photosensitive material by using SHG (non-linear optical element 415 nm).

By the selection of the wavelengths and by driving with the driving circuit of FIG. 2, the exposure to the second laser 6b is effective as a light bias against the high intensity short time reciprocity of the silver salt photosensitive material (recording material). By reducing the laser output to one half, the output can be further reduced.

Embodiment 3

Figure 4:
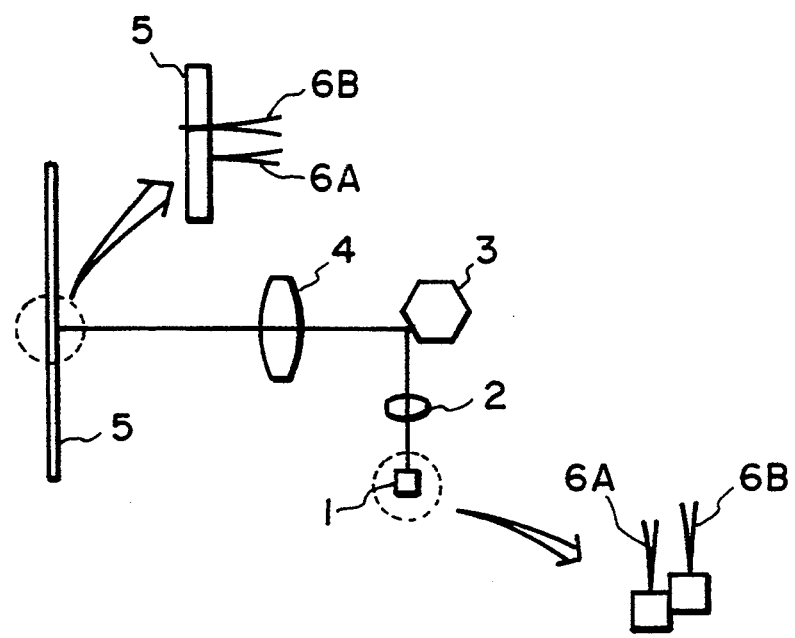
FIG. 4 shows a light recording apparatus according to a further embodiment of the present invention.

FIG. 4 shows a further embodiment. In this embodiment, the semiconductor lasers are deviated in the direction of the optical axis, and only the first laser beam 6A is focused on the photosensitive material 5. The driving circuit for this embodiment is the same as shown in FIG. 2. By setting the semiconductor lasers in this manner, the following advantages are provided:

(1) By the deviation of the imaging point of the second laser from the surface of the photosensitive material, the beam diameter of the laser beam is made different, so that the light bias effect is provided which is effective to reduce the high intensity short time reciprocity: and (2) By the use of the two lasers having different diameter on the recording material, the tone reproducibility is improved.

In the third embodiment, it is a possible alternative that the aberration of the optical system is corrected for the wavelength of the first laser, by which the beam image diameter of the second laser is, in effect, made different from that of the first laser.

In this embodiment, the semiconductor lasers are arranged in the direction of the main scan of the laser beam, but they may be arranged in the direction of the subordinate scan.

From the standpoint of production of foggy background to maintain the resolution of the image even if the same information is written by the two lasers, it is preferable that the ratio of the beam diameters is not more than 10 times. It is also preferable to reduce the laser output of the larger diameter beam to prevent the production of the foggy background.

According to the foregoing embodiments, the same image data are applied a plurality of times on the recording material at different times in a light recording apparatus wherein fine spot beam scans the recording material, and therefore, the high intensity short time reciprocity can be avoided, and in addition, the tone reproduction control is made easier.

Embodiment 4

Figure 5:
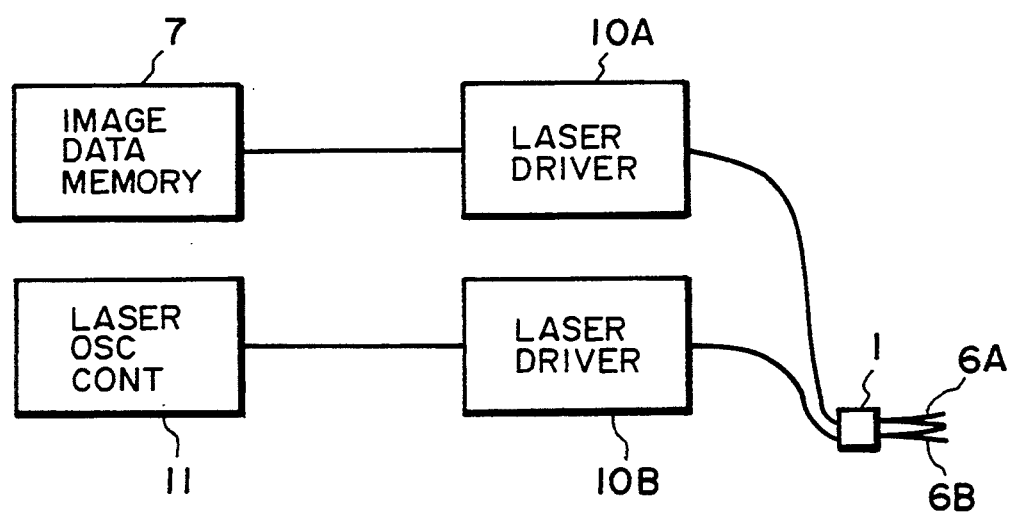
FIG. 5 is a block diagram of an electric circuit for the optical scan according to the further embodiment.

FIG. 5 is a block diagram of another semiconductor laser driver. The structure thereof is similar to that of the first embodiment, but the laser driving method is different. In this embodiment, the image data signal supplied from the image data memory 7 is transmitted to the laser driver circuit 10a, and the laser beam 6B is projected on the recording material for the recording thereon in accordance with the image data signal.

From the laser emission control circuit 11, a laser emission control signal is supplied to the laser driver circuit 10b so that the entirety of the image area is uniformly exposed, and the recording surface is bias-exposed by the laser beam 6B.

The scannings with the laser beams 6A and 6B on the recording material are different in the timing by $T = x/v$ where the x is the distance between the beams on the recording material, and v is a scanning speed of the laser beam 6 thereon. The light intensity of the laser beam is so selected that the final image does not involve the foggy background on the photosensitive material.

By exposing the photosensitive material 5 to a fine spot for the image exposure and to a fine spot for the bias exposure at the same point, the high intensity short time reciprocity of the photosensitive material can be reduced by the bias light. In addition, by changing the intensity of the bias light, the $\gamma$ characteristics of the image exposure can be controlled.

Embodiment 5

The fifth embodiment is a modification of the second embodiment described in the foregoing. One of the two laser beams is used for the bias exposure, and the semiconductor lasers providing different wavelengths are arranged in a horizontal plane. The same overlapping exposure operation is carried out as in the fourth embodiment.

Similarly to the second embodiment, the wavelength of the image exposure laser corresponds to the absorption wavelength of the sensitizing dye of the silver salt photosensitive material (830 nm), and the wavelength of the bias exposure laser corresponds to the silver inherent sensitivity wavelength of the silver salt photosensitive material (415 nm) by SHG.

By such selection of the wavelengths, similarly to the other embodiments, the reciprocity can be reduced, and the tone gradation reproducibility is improved.

Embodiment 6

This embodiment is similar to the embodiment of FIG. 4. The two semiconductor lasers producing the same wavelength beam are deviated in the direction of the optical axis so that the image point of the image exposure laser is on the photosensitive material. The same driving method is used as in Embodiment 4, that is, the exposure on the basis of the image data memory and the uniform exposure not including the image information are simultaneously effected.

By the use of such semiconductor lasers, the following advantages are provided:

(1) By the deviation of the focus point of the bias laser from the surface of the photosensitive material, the beam diameter of the laser beam is expanded. This provides a function of multi-exposures of the bias beam, so that the high intensity short time reciprocity can be reduced. In addition, the high tone reproducibility images can be provided.

In this embodiment, it is a possible alternative that the beam size of the second laser is made substantially different from that of the first laser by correcting the aberrations of the optical system for the first laser wavelength. In the fourth to sixth embodiments, the semiconductor lasers are arranged in the main scan direction of the beam, but they may be arranged in the subordinate scan direction.

As described in the foregoing, while at least one fine beam spot is scanning the recording material, the beam corresponding to the image data scans. In addition, at least one fine beam continuously emits the fine spot beam in the image region in the deflecting scanning operation. Therefore, the high intensity short time reciprocity can be removed, and therefore, the tone control can be easily performed. Since the plural exposures are effected by the single optical system, there is no need for the additional illumination device. Thus, a small size and simple apparatus are possible. The non-necessity for the additional optical system does not require additional light shield.

Figure 6:
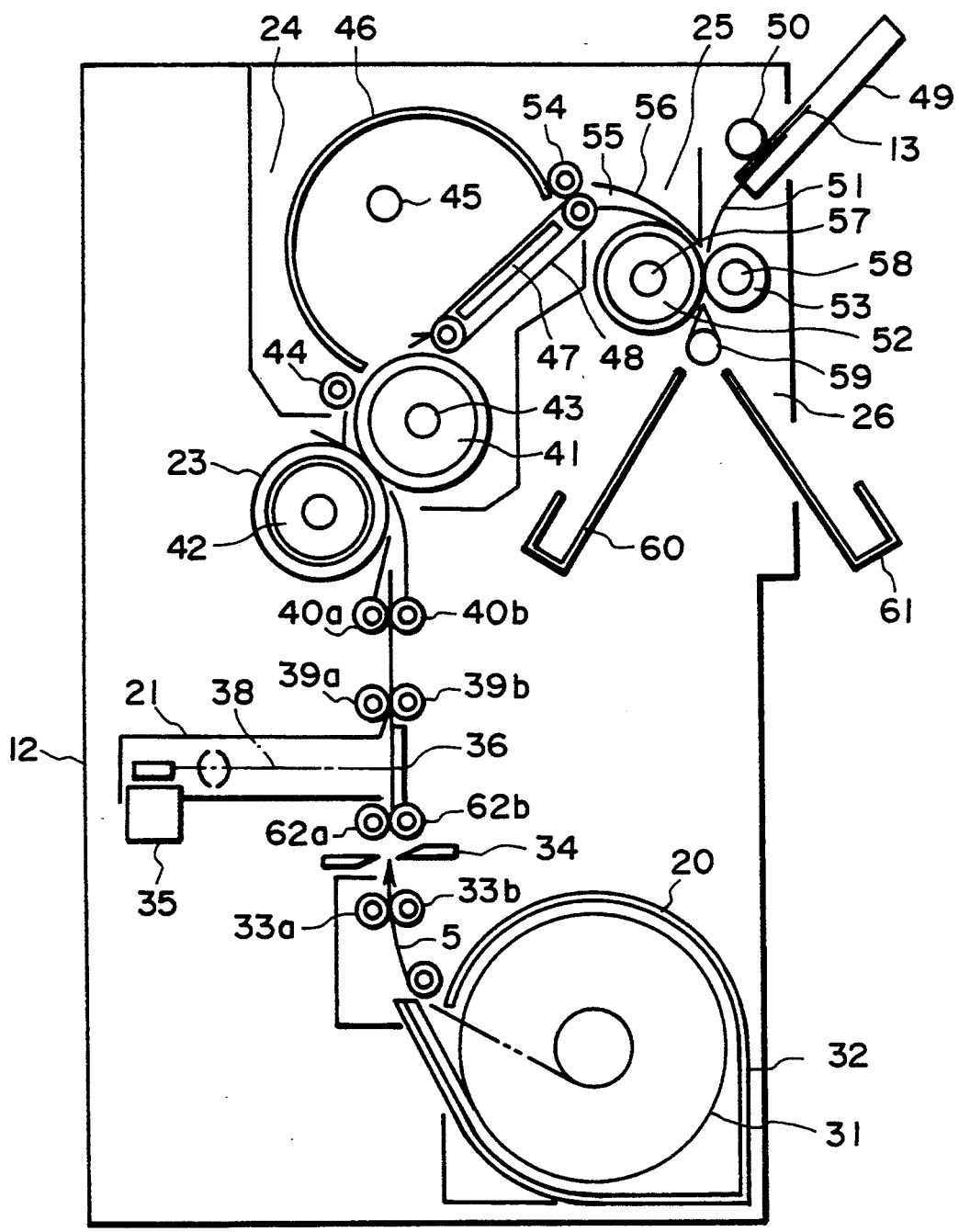
FIG. 6 is a sectional view of an example of a recording apparatus to which the present invention is applicable.

Referring to FIG. 6, the description will be made as to a dry silver salt apparatus according to an embodiment of the present invention. FIG. 6 is a sectional view of the apparatus 12 with which the light beam application method described in the foregoing is usable. It comprises a sheet feeding station 20, an image exposure station 21, a heat development station 23, a whole surface exposure station 24, a transfer station 25 and sheet discharging station 26. The description will be made as to the respective stations.

(1) Feeding Station 20

The sheet feeding station 20 is provided with a photosensitive member cartridge 32 accommodating a roll 31 of the photosensitive member 5. The photosensitive member cartridge 32 has an outlet, where a pair of supply rolls 33a and 33b are disposed, by which a predetermined length of the photosensitive member is fed out. The photosensitive member 5 dispensed in a predetermined length is cut by a cutter unit 34 and fed by rollers 62a and 62b to the image exposure station 21.

(2) Image Exposure Station 21

The photosensitive member 5 fed from the feeding station 20 is exposed to the beams 38 by a laser beam scanning exposure means 35 in one of the manner described in the foregoing. A supporting member 36 is effective to bear the photosensitive member 5 to suitably hold the photosensitive member 5 during the image exposure operation, whereafter the photosensitive member 5 is fed by rollers 39a and 39b to the heating and developing station 23.

(3) Heating and Developing Station 23

The photosensitive member 5 having been exposed to the light image is conveyed by conveying rollers 40a and 40b to the heating and developing station 23, where it is supported by a heating roll 41 and a back-up roller 42 and is heated at the temperature of approximately 120° C. to be developed. The heating source is in the form of a halogen heater 43 disposed inside the heating roll 41, in this embodiment.

(4) Whole Surface Exposure Station 24

The developed photosensitive member 5 is then conveyed by a conveying roller 44 to the whole surface exposure station 24 which comprises a light source 45, a guide 46 for the light source 45, a heating plate 47 and a conveying belt 48.

(5) Transfer Station 25

An image receiving material 13 is accommodated in an image receiving material cartridge 49 which is detachably mountable on the apparatus. The image receiving material 13 is supplied from the cartridge 49 by a feeding roller 50 and is supplied to image transfer rollers 52 and 53 along a conveyance guide 51.

On the other hand, the photosensitive member 5 is fed from the whole surface exposure station 24 by a conveying roller 54 along conveyance guides 55 and 56 to the transfer rollers 52 and 53. The image receiving material 13 and the photosensitive member 5 are overlaid in a predetermined positional relation in the transfer station 25. The transfer rollers 52 and 53 form a nip through which the overlaid image receiving material 13 and the photosensitive member 5 are passed. During the passage through the nip, they are heated by halogen heaters 57 and 58 disposed inside the transfer roller, by which the diffusing dye material is diffused from the photosensitive member 5 to the image receiving material 13 to form a color image. The image transfer temperature is 70°–170° C., preferably 100°–150° C., further preferably 100°–130° C.

(6) Discharging Station 26

Then, the photosensitive member 5 and the image receiving material 13 are separated from each other by a separation pawl 59, and thereafter, they are conveyed to discharge trays 60 and 61.

Figure 7:
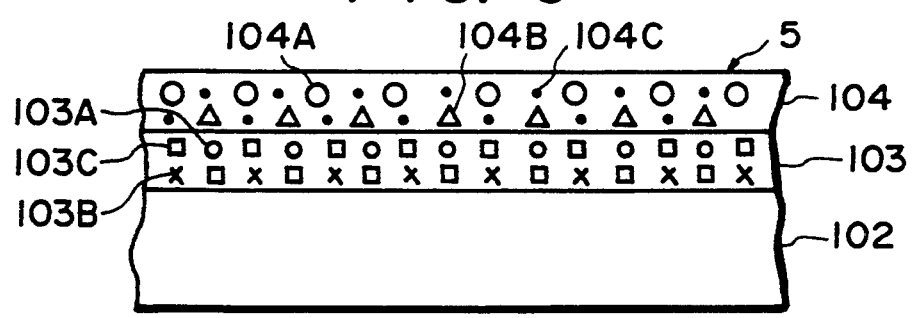
FIG. 7 is a partial enlarged view of a photosensitive member used in the apparatus.

Referring to FIG. 7, the description will be made as an example of the photosensitive material (photosensitive member) usable with the present invention.

Referring to FIG. 7, an enlarged sectional view of the photosensitive member is schematically shown. The photosensitive member 5 includes a resin film 102, a polymerization layer 103 and a photosensitive layer 104. The resin film 102 comprises polyester, polycarbonate, polyimide or aromatic polyamide or the like. The polymerization layer comprises monomer 103A, photopolymerization initiating material 103B and heat diffusible type dye 103C. The monomer 103A comprises trimethylol propanetriacrylate, dipentaerythritol hexaacrylate, or the like. The initiating material 103B comprises a material of a cleavage type such as benzyl dimethylketal or the like or a hydrogen removing type such as a combination of diethylthioxanthone and dimethylaminebenzolethyl. The dye 103C comprises styryl group, anthraquinone group or indoaniline group or the like. The photosensitive layer comprises reducing material 104A, photosensitive silver halide 104B and organic silver salt 104C. The reducing material 104A is 1-naphthol group, 2,2'-methylenebis(alkylphenol) group, 4,4'-methylenebis(alkylphenol) group or the like. The silver halide may comprise silver bromide, silver iodobromide, silver chlorobromide or the like. The organic silver salt 104C may comprise behenic acid silver or benzotriazole silver or the like. In this description, the polymerization layer and the photosensitive layer are separated. However, these layers may constitute a single layer. The photosensitive layer 104 may comprise sensitizing coloring material such as cyanine, melocyanine or the like having an absorption wavelength for the information light exposed.

In the foregoing, the photosensitive member comprises the dry silver salt layer and a polymerization laser, but the present invention is usable with the photosensitive member comprising the dry silver salt layer only. The material used as the photosensitive member is not limited to the dry silver photosensitive member, but the present invention is usable with the photoresist material, sublimation material or the like.

While the invention has been described with reference to the structures disclosed herein, it is not confined to the details set forth and this application is intended to cover such modifications or changes as may come within the purposes of the improvements or the scope of the following claims.

What is claimed is:

1. An image recording apparatus for recording an image by application of light beams to a photosensitive member, comprising:

a photosensitive member;

light source means for emitting first and second means, both of the first and second beams bearing image information, wherein one of the first and second beams is defocused on said photosensitive member; and scanning means for scanning said photosensitive member with the first and second beams with a time interval therebetween so that they are overlapped on said photosensitive member.

2. An image recording apparatus for recording an image by application of light beams to a photosensitive member, comprising:

a photosensitive member;

light source means for emitting first and second light beams, wherein one of the first and second light beams bears image information and the other beam does not and is defocused on said photosensitive member; and scanning means for scanning said photosensitive member with the first and second beams with a time interval therebetween so that they are overlapped on said photosensitive member.

3. An apparatus according to claim 2, wherein the first and second beams have different wavelengths.

4. An apparatus according to claim 2, wherein the first and second beams are different in light intensity.

5. An apparatus according to claim 2, wherein said photosensitive member is a dry silver salt photosensitive member.

* * * * *

UNITED STATES PATENT AND TRADEMARK OFFICE
CERTIFICATE OF CORRECTION

PATENT NO. : 5,398,052
DATED : March 14, 1995
INVENTOR(S) : KAZUO ISAKA, et al.

It is certified that error appears in the above-indentified patent and that said Letters Patent is hereby corrected as shown below:

In the Abstract, line 2, change "beam" to --beams--.

Column 2, line 22, change "array I pass" to --array I, pass--; and
line 39, change "butter 8" to --buffer 8-- and change "at" to --a--.

Column 3, line 6, change "(837m)," to --(837nm),--.

Column 5, line 37, change "manner" to --manners--.

Column 6, line 59, change "laser," to --layer,--.

Column 7, line 11, change "means," to --beams,--.

Signed and Sealed this

Eighteenth Day of July, 1995

Attest:

BRUCE LEHMAN

*Attesting Officer*   *Commissioner of Patents and Trademarks*